(12) United States Patent
Ray

(10) Patent No.: US 10,908,374 B2
(45) Date of Patent: *Feb. 2, 2021

(54) FIBER RIBBON STORAGE BOX

(71) Applicant: All Systems Broadband, Inc., Livermore, CA (US)

(72) Inventor: Craig Dwayne Ray, Fuquay-Varina, NC (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,096

(22) Filed: Jul. 11, 2019

(65) Prior Publication Data

US 2019/0361187 A1    Nov. 28, 2019

Related U.S. Application Data

(63) Continuation of application No. 15/140,530, filed on Apr. 28, 2016, now Pat. No. 10,393,979, which is a continuation of application No. 14/040,003, filed on Sep. 27, 2013, now Pat. No. 9,606,315.

(60) Provisional application No. 61/789,749, filed on Mar. 15, 2013.

(51) Int. Cl.
*G02B 6/44* (2006.01)

(52) U.S. Cl.
CPC ......... *G02B 6/4446* (2013.01); *G02B 6/4454* (2013.01); *G02B 6/4478* (2013.01); *Y10T 29/49826* (2015.01)

(58) Field of Classification Search
CPC .................................................. G02B 6/4478
See application file for complete search history.

(56) References Cited

U.S. PATENT DOCUMENTS

| 4,702,551 A | 10/1987 | Coulombe |
| 4,717,231 A | 1/1988 | Dewez et al. |
| 4,765,709 A | 8/1988 | Suillerot et al. |
| 4,770,357 A | 9/1988 | Sander et al. |
| 4,792,203 A | 12/1988 | Nelson et al. |
| 5,100,221 A | 3/1992 | Carney et al. |
| 5,119,459 A | 6/1992 | Meyerhoefer et al. |
| 5,129,030 A | 7/1992 | Petrunia |
| 5,142,607 A | 8/1992 | Petrotta et al. |
| 5,163,988 A | 11/1992 | Setaishi et al. |
| 5,185,845 A | 2/1993 | Jones |
| 5,268,986 A | 12/1993 | Kakii et al. |

(Continued)

*Primary Examiner* — Rhonda S Peace
(74) *Attorney, Agent, or Firm* — Murphy, Bilak & Homiller, PLLC

(57) ABSTRACT

A fiber optic termination box includes a planar back section, outer walls, an exterior cable port formed in an outer wall, and a bend control structure. The bend control structure includes first and second curved planar sections that extend away from the from the planar back section, and first and second planar tabs that attach respectively to top edges of the first and second curved planar sections. The first curved planar section includes a first lower edge side, and a first bend that towards the second curved planar section. The second curved planar section includes a second lower edge side, and a second bend that curves towards the first curved planar section. The first planar tab extends in an opposite direction as the first bend. The second planar tab extends in an opposite direction as the second bend.

11 Claims, 9 Drawing Sheets

(56) References Cited

U.S. PATENT DOCUMENTS

| | | |
|---|---|---|
| 5,278,933 A | 1/1994 | Hunsinger et al. |
| 5,421,532 A | 6/1995 | Richter |
| 5,546,495 A | 8/1996 | Bruckner et al. |
| 5,553,186 A | 9/1996 | Allen |
| 5,717,812 A | 2/1998 | Vandenenden et al. |
| 5,825,964 A | 10/1998 | Goetter et al. |
| 5,933,563 A | 8/1999 | Schaffer et al. |
| 5,970,199 A | 10/1999 | Minchey et al. |
| 6,112,006 A | 8/2000 | Foss |
| 6,311,007 B1 | 10/2001 | Daoud |
| 6,370,309 B1 | 4/2002 | Daoud |
| 6,424,782 B1 | 7/2002 | Ray |
| 6,456,772 B1 | 9/2002 | Daoud |
| 6,542,688 B1 | 4/2003 | Battey et al. |
| 6,591,053 B2 | 7/2003 | Fritz |
| 6,612,515 B1 | 9/2003 | Tinucci et al. |
| 6,625,374 B2 | 9/2003 | Holman et al. |
| 6,678,455 B1 | 1/2004 | Knight |
| 6,738,554 B2 | 5/2004 | Daoud et al. |
| 6,944,383 B1 | 9/2005 | Herzog et al. |
| 7,031,588 B2 | 4/2006 | Cowley et al. |
| 7,274,852 B1 * | 9/2007 | Smrha ............... G02B 6/4454 385/134 |
| 7,310,471 B2 | 12/2007 | Bayazit et al. |
| 7,369,741 B2 | 5/2008 | Reagan et al. |
| 7,376,324 B2 | 5/2008 | Foord et al. |
| 7,376,325 B1 | 5/2008 | Cloud et al. |
| 7,463,810 B2 | 12/2008 | Bayazit et al. |
| 7,482,536 B2 | 1/2009 | Marquardt |
| 7,822,310 B2 | 10/2010 | Castonguay et al. |
| 7,889,961 B2 | 2/2011 | Cote et al. |
| 8,009,954 B2 * | 8/2011 | Bran de Leon ...... G02B 6/4454 385/135 |
| 8,559,784 B2 | 10/2013 | Ray et al. |
| 8,718,435 B2 * | 5/2014 | Marsac ............... G02B 6/4446 385/135 |
| 8,913,868 B2 | 12/2014 | Hangebrauck |
| 9,279,950 B2 | 3/2016 | Lichoulas et al. |
| 9,372,319 B1 * | 6/2016 | Ray .................... G02B 6/4478 |
| 9,606,315 B2 | 3/2017 | Ray |
| 9,678,292 B2 * | 6/2017 | Landry ................ H05K 7/16 |
| 10,393,979 B2 * | 8/2019 | Ray .................... G02B 6/4478 |
| 2002/0051616 A1 | 5/2002 | Battey et al. |
| 2002/0081088 A1 * | 6/2002 | Kasai .................. G02B 6/4477 385/135 |
| 2004/0020232 A1 | 2/2004 | Marquardt |
| 2007/0009214 A1 | 1/2007 | Elkins et al. |
| 2007/0071392 A1 | 3/2007 | Baucom et al. |
| 2009/0042513 A1 | 2/2009 | Woosnam |
| 2011/0164854 A1 | 7/2011 | Desard et al. |
| 2011/0217017 A1 | 9/2011 | Drouard et al. |
| 2011/0249941 A1 * | 10/2011 | Allwood ............... H02G 3/083 385/56 |
| 2012/0134639 A1 * | 5/2012 | Giraud ................ G02B 6/4454 385/135 |
| 2013/0105420 A1 | 5/2013 | Ray et al. |
| 2014/0259611 A1 | 9/2014 | Ray |
| 2015/0241654 A1 | 8/2015 | Allen et al. |
| 2016/0238809 A1 | 8/2016 | Ray |
| 2019/0361187 A1 * | 11/2019 | Ray .................... G02B 6/4478 |

* cited by examiner

FIBER RIBBON STORAGE BOX

RELATED APPLICATIONS

This application is a continuation of U.S. application Ser. No. 15/140,530 filed 28 Apr. 2016, which in turn is a continuation of U.S. application Ser. No. 14/040,003 filed 27 Sep. 2013, which claims priority to provisional U.S. Application No. 61/789,749 filed 15 Mar. 2013, the content of said applications incorporated herein by reference in their entirety.

TECHNICAL FIELD

The present invention generally relates to optical communications equipment, and particularly relates to methods for storing optical fiber ribbon.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth and lower losses.

In telecommunications, the term "demarcation point" is used to refer to the point at which the communications service provider cabling ends and connects to a customer's on-premises wiring, cabling, and the like. The customer is generally responsible for installation and maintaining of cabling and equipment on the customer's side of the demarcation point.

A demarcation box is often placed at the demarcation point and is used to house the physical interface between the service provider's network and the customer's cabling. When that cabling involves fiber optic cables, the demarcation box, or fiber termination box, must typically provide secure storage for fiber splices, to allow an installer to connect a fiber optic cable to cabling in the box, and may provide fan-out cabling to one or several fiber optic connectors, for connection to customer cabling and equipment.

One type of fiber optic cable that is commonly used is ribbon fiber optic cable. Ribbon fiber optic cable includes individual optical fibers arranged side by side and laminated by a relatively durable material, such as plastic, in a ribbon-like form that positions, holds and protects the fibers. These ribbons may be paired with additional components, such as buffer layers and strength members, and encased by a jacketing material.

Splicing a ribbon fiber optic cable at a demarcation box involves exposing ribbon segments of the fiber optic cables to be spliced from the jacketing material and making the splice with these exposed ribbon segments. In general, exposed ribbon fiber is fragile and must be stored in an organized fashion that protects optical fibers in the exposed ribbon from damage. The physical properties of ribbon fiber optic cable are such that the ribbon is resistive to acute changes in shape and thus tends to resist any organized routing of the ribbon.

Operators continue to seek reduced costs and improved reliability of the terminations and the interfaces to the customer network. Accordingly, improvements in the design of these termination boxes and in techniques for terminating fiber optic cables are needed.

SUMMARY

Embodiments of the present invention include improved termination boxes, as described herein, as well as improved techniques for storing fiber optic ribbons within such termination boxes.

In one embodiment, a method for terminating a fiber optic cable is disclosed. A termination box is provided. A terminating end of a fiber optic cable is attached to the termination box, such that one or more exposed ribbon fiber segments from the fiber optical cable are accessible from inside the termination box. One or more fan-out fiber optic cables are attached to the termination box, such that one or more exposed ribbon fiber segments front the fan-out fiber optic cables are accessible from inside the termination box. An exposed ribbon fiber segment from the fiber optic cable is spliced to a corresponding exposed ribbon fiber segment from the one or more fan-out fiber optic cables, such that the resulting splice has a splice covering and such that the spliced ribbon fiber segments and the splice covering form a continuous length of exposed ribbon fiber between the fiber optical cable and the fan-out fiber optic cables. The splice covering is secured to a splice retention cradle. The splice retention cradle with the secured splice covering is rotated so that the continuous length of exposed ribbon fiber crosses itself at a point between the splice retention cradle and the termination box. The splice retention cradle is secured to the termination box such that the exposed ribbon fiber remains crossed and forms a double loop. The double loop of exposed ribbon fiber is flipped so that the double loop crosses itself and the crossed double loop is folded to form a quadruple loop of exposed ribbon fiber. The quadruple loop of exposed ribbon fiber is secured to the termination box, using two or more routing clips attached to the termination box.

In another embodiment, a method for splicing and securing fiber optic cables in a demarcation box, each fiber optic cable including interior ribbon fibers, is disclosed. A demarcation box is provided. A terminating end of a fiber optic cable is inserted through an exterior cable port of the demarcation box. A length of ribbon fiber is exposed from a jacketed portion of the terminating end of the fiber optic cable. The terminating end of the fiber optic cable is secured to the demarcation box such that the length of exposed ribbon fiber is accessible from inside the demarcation box. A length of ribbon fiber is exposed from a jacketed portion of the fan-out fiber optic cable. The fan-out fiber optic cable is secured to the demarcation box such that the length of exposed ribbon fiber is accessible from inside the demarcation box. The exposed ribbon fiber from the fiber optic cable is secured to a corresponding exposed length of fan-out fiber optic cable such that the resulting splice has a splice covering and such that the spliced ribbon fiber segments and the splice covering form a continuous length of exposed ribbon fiber between the fiber optical cable and the fan-out fiber optic cables. The splice covering is secured to a splice retention cradle. The continuous length of exposed ribbon fiber is positioned so that the continuous length of exposed ribbon fiber crosses itself at a point between the splice retention cradle and the demarcation box. The splice retention cradle is secured to the termination box such that the exposed ribbon fiber remains crossed and forms a double loop. The double loop of exposed ribbon fiber is twisted so that the double loop crosses itself and the crossed double loop is folded to form a quadruple loop of exposed ribbon fiber. The quadruple loop of exposed ribbon fiber is secured to the demarcation box, using two or more routing clips attached to the demarcation box.

In another embodiment, a fiber optic cable splice storage assembly is disclosed. The fiber optic cable splice storage assembly includes a termination box including first and second curve shaped bend controls disposed in an upper half of the termination box. The first and second curve shaped bend controls face each other and are detached from one another. The termination box further includes an exterior cable port disposed at a lower side of the termination box and including an opening that is dimensioned to allow a terminating end of a fiber optic cable to be fed into the termination box, and a splice retention cradle frame disposed between the first and second curve shaped bend controls in the top half of the termination box. The assembly further includes a splice retention cradle having splice retention features that are dimensioned to accommodate a splice covering for fiber optic cable. The splice retention cradle frame is dimensioned such that the splice retention cradle may snap-in securely to the splice retention cradle frame.

According to another embodiment, the fiber optic cable splice storage assembly includes a termination box. The termination box includes first and second curve shaped bend controls disposed in an upper half of the termination box, wherein the first and second curve shaped bend controls face each other and are detached from one another, an exterior cable port disposed at a lower side of the termination box and comprising an opening that is dimensioned to allow a terminating end of a fiber optic cable to be fed into the termination box, and a splice retention cradle frame disposed between the first and second curve shaped bend controls in the top half of the termination box. The fiber optic cable splice storage assembly additionally includes a splice retention cradle comprising splice retention features that are dimensioned to accommodate a splice covering for fiber optic cable. The first and second curve shaped bend controls each include a curved surface extending away from a planar back section of the termination box. The planar surface is spaced apart from the planar back section. The splice retention cradle frame is disposed below the first and second curve shaped bend controls in a vertical direction of the termination box when the splice retention cradle is snapped securely into the splice retention cradle frame. The first and second curve shaped bend controls each include first and second planar surfaces disposed respectively at the lower and upper ends of the first and second curve shaped bend controls, the first planar surfaces extending in a horizontal direction that is perpendicular to the vertical direction, and the second planar surfaces extending in the vertical direction.

In another embodiment, a fiber optic cable assembly is disclosed. The fiber optic cable assembly includes a termination box including first and second curve shaped bend controls disposed in an upper half of the termination box. The first and second curve shaped bend controls face each other and are detached from one another. The termination box further includes an exterior cable port disposed at a lower side of the termination box and including an opening that is dimensioned to allow a terminating end of a fiber optic cable to be fed into the termination box, a splice retention cradle frame disposed between the first and second curve shaped bend controls in the top half of the termination box, a splice retention cradle securely snapped into the splice retention cradle frame and having splice retention features, a first fiber optic cable having a first exposed ribbon fiber segment and being fed through the exterior cable port, and a second fiber optic cable having a second exposed ribbon fiber segment. The first exposed ribbon fiber segment is spliced with the second exposed ribbon fiber segment. The splice of the first and second exposed ribbon fiber segments is secured to the splice retention features of the splice retention cradle. The first and second exposed ribbon fiber segments are organized in a number of loops with at least one of the loops being placed around the first and second curve shaped bend controls.

In another embodiment, a fiber optic termination box is disclosed. The fiber optic termination box includes a planar back section, outer walls surrounding the planar back section, an exterior cable port formed in a first one of the outer walls and comprising an opening that is dimensioned to allow a terminating end of a fiber optic cable to be fed into the termination box, and a bend control structure. The bend control structure includes first and second curved planar sections that are affixed to and extend away from the from the planar back section, and first and second planar tabs that attach respectively to the first and second curved planar sections at top edges of the respective first and second curved planar sections that are opposite the planar back section. The first curved planar section includes a first lower edge side that faces the first outer wall, and a first bend that curves away from the first lower edge side and towards the second curved planar section. The second curved planar section includes a second lower edge side that faces the first outer wall, and a second bend that curves away from the first second lower edge side and towards the first curved planar section. The first planar tab laterally extends away from the first lower edge side in an opposite direction as the first bend. The second planar tab extends away from the second lower edge side in an opposite direction as the second bend.

DETAILED DESCRIPTION

Figure 1:
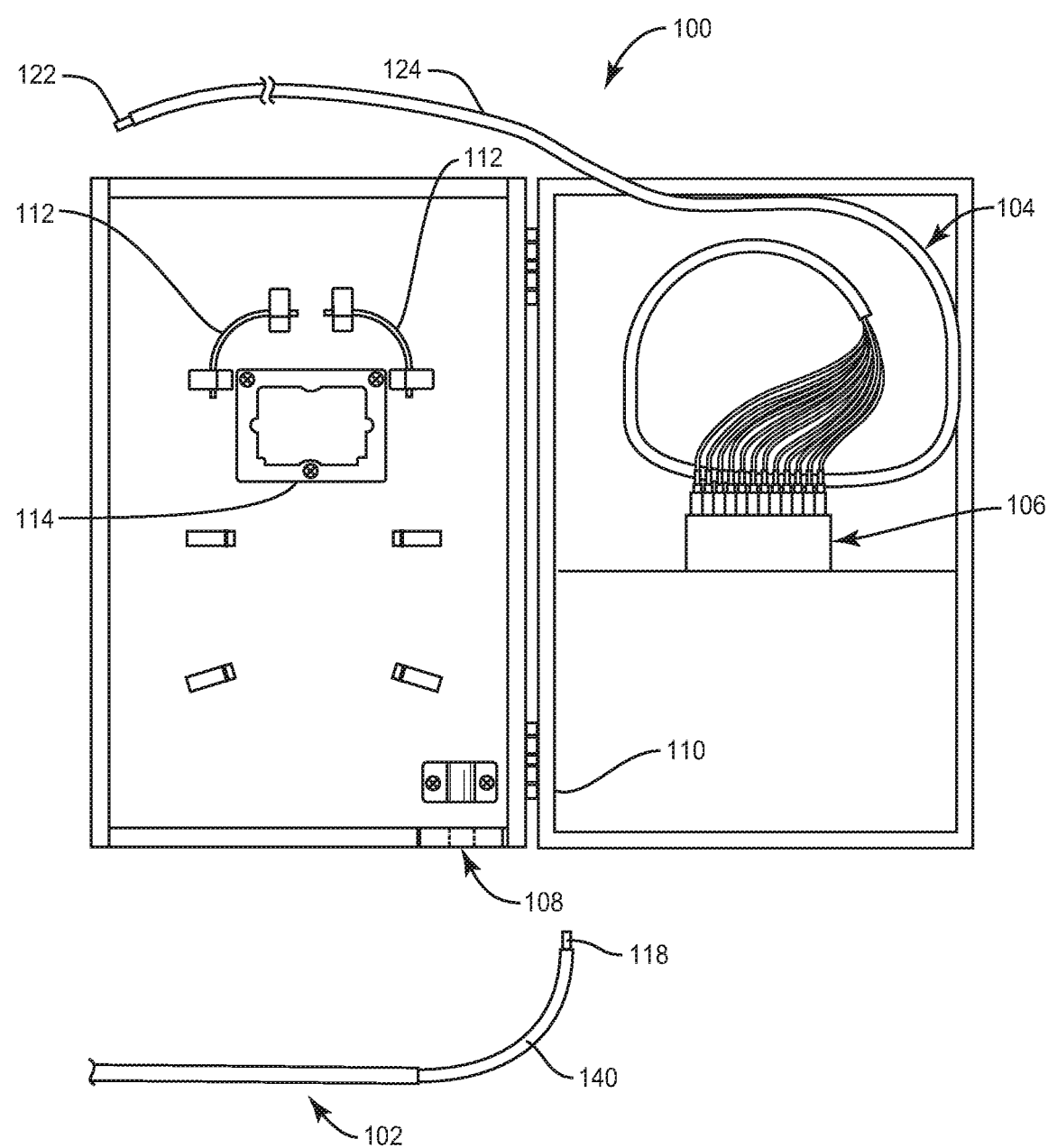
FIG. 1 depicts a termination box and fiber optic cables used in a method for terminating a fiber optic cable, according to an embodiment.
Figure 2:
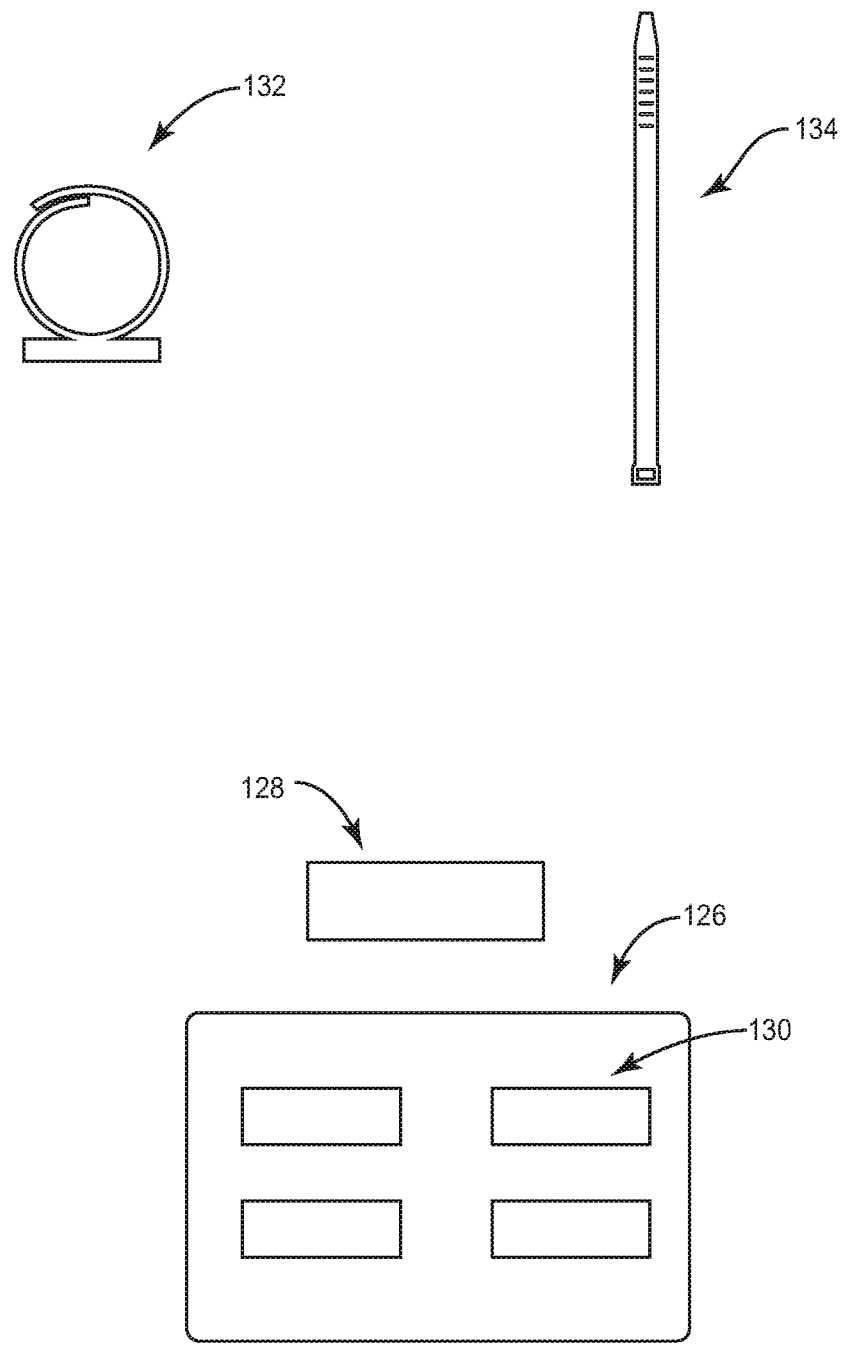
FIG. 2 depicts additional components used in a method for terminating a fiber optic cable, according to an embodiment.

The components shown in FIGS. 1-2 are exemplary components that may be used in a method for terminating a fiber optic cable. FIGS. 3-9 depict various steps in a method for terminating a fiber optic cable, according to an embodiment, using the components of FIGS. 1-2. It should be appreciated, however, that the techniques illustrated in FIGS. 3-9 may be more generally applied, using equipment that is generally similar to the components illustrated in FIGS. 1-2 but differing in shape, count, or other details.

Referring to FIG. 1, a termination box 100, terminating end of a fiber optic cable 102 and a fan-out fiber optic cable 104 are shown.

Termination box 100 may be, for example, a layered fiber demarcation box designed for high-density fiber connectivity and splicing for indoor all mount applications. Termination boxes such as termination box 100 provide an enclosure that securely protects a splice of the terminating end of the fiber optic cable 102 and the fan-out fiber optic cable 104. Moreover, termination boxes such as termination box 100 securely protect any exposed ribbon fiber resulting from a splice of, for example, fiber optic cables 102, 104.

Termination box 100 depicted in FIG. 1 includes a customer terminal interface 106, an exterior able port 108, an exterior cable retention feature 110, bend controls 112 and a splice retention cradle frame 114.

The customer terminal interface 106 provides an interface for individual fibers of the fan-out fiber optic cable 104 to be connected to, e.g., a customer's on-premises wiring.

The exterior cable port 108 provides an opening that allows the terminating end of the fiber optic cable 102 to be fed into the termination box 100 for splicing.

The exterior cable retention feature 110 may include a semi-circular structure dimensioned to surround the fiber optic cable 102 and securely retain the fiber optic cable 102 to the termination box 100. Ideally, the exterior cable retention feature 110 is positioned near the exterior cable port 108 and made of relatively strong material to resist forces exerted on the fiber optic cable 102. This reduces the possibility that a splice between the fiber optic cables 102, 104 is destroyed due to external forced exerted on the fiber optic cable 102.

The bend controls 106 provide a rounded shape for the routing of ribbon segments from fiber optic cables 102, 104, and additionally provide a surface from which to fasten the fiber optic cable cables 102, 104.

The splice retention cradle frame 114 provides a frame to mount a retention cradle that retains and protects a splice of fiber optic cables 102, 104. For instance, the splice retention cradle frame 114 may be dimensioned in a complementary fashion to a splice retention cradle, so that the splice retention cradle may snap-in securely.

The fiber optic cable 102 may be, for example, a cable connected to a communication network that carries voice, data, etc., from a service provider. The fiber optic cable 102 depicted in FIG. 1 includes interior ribbon fiber that contains individual optical fibers. FIG. 1 depicts an exposed ribbon fiber segment 118 at an end of the fiber optic cable 102, where the interior ribbon fiber is exposed from a jacket portion 120 of the fiber optic cable 102 at an end of the fiber optic cable 102.

The fan-out fiber optic cable 104 may be, for example, a fiber optic cable that fans out to customer endpoints within a residence or business. FIG. 1 depicts individual fan-out connections from one end of the fan-out fiber optic cable 104 to the customer terminal interface 106. On an opposite end of the fan-out fiber optic cable 104 is an exposed ribbon segment 122. The exposed ribbon segment 122 corresponds to an interior ribbon fiber of the fan-out fiber optic cable 104 and includes individual optical fibers that are associated with the individual fan-out connections to the customer terminal interface 106.

The exposed ribbon fiber segments 118, 122 are used to splice the fiber optic cable 102 to the fan-out fiber optic cable 104. As a result of this splice, communication service may be provided to the individual fan-out connections and ultimately customer endpoints within a residence or business.

Referring to FIG. 2, a splice retention cradle 126, a splice covering 128, routing clips 132, and tie clips 134 are shown.

The splice retention cradle 126 is a substantially rigid structure used to secure a splice of the exposed ribbon fiber segment 118, 122 to one another and to the termination box 100. The splice retention cradle 126 may include splice covering retention features 130 that are dimensioned complementary to the splice covering 128 so that the splice covering 128 may snap in securely.

The splice covering 128 covers and protect splices of exposed ribbon fiber from exterior environmental conditions that may damage the splice. According to an embodiment, the splice covering 128 used to splice the exposed ribbon fiber segments 118, 122 is a substantially rigid splice covering 128.

Additionally, routing clips 132 are shown. The routing clips 132 are movable clips used to gently retain the exposed fiber segments 118, 122 to the termination box 100 in an organized manner. The routing clips 132 include a circular portion that retains the exposed fiber segments 118, 122 and a break feature in the circular portion that allows for insertion of the exposed fiber segments 118, 122 into the interior circumference of the circular portion. The routing clips 132 may be positioned in several locations of the termination box 100 to accommodate and loops of, e.g., exposed fiber segments 118, 122.

Finally, FIG. 2 depicts a tie wrap 134. The tie wrap 134 may be any conventional tie wrap, such as a plastic tie wrap or other fastening device that can be used to affix fiber optic cables 102, 104 to fixed structures.

Figure 3:
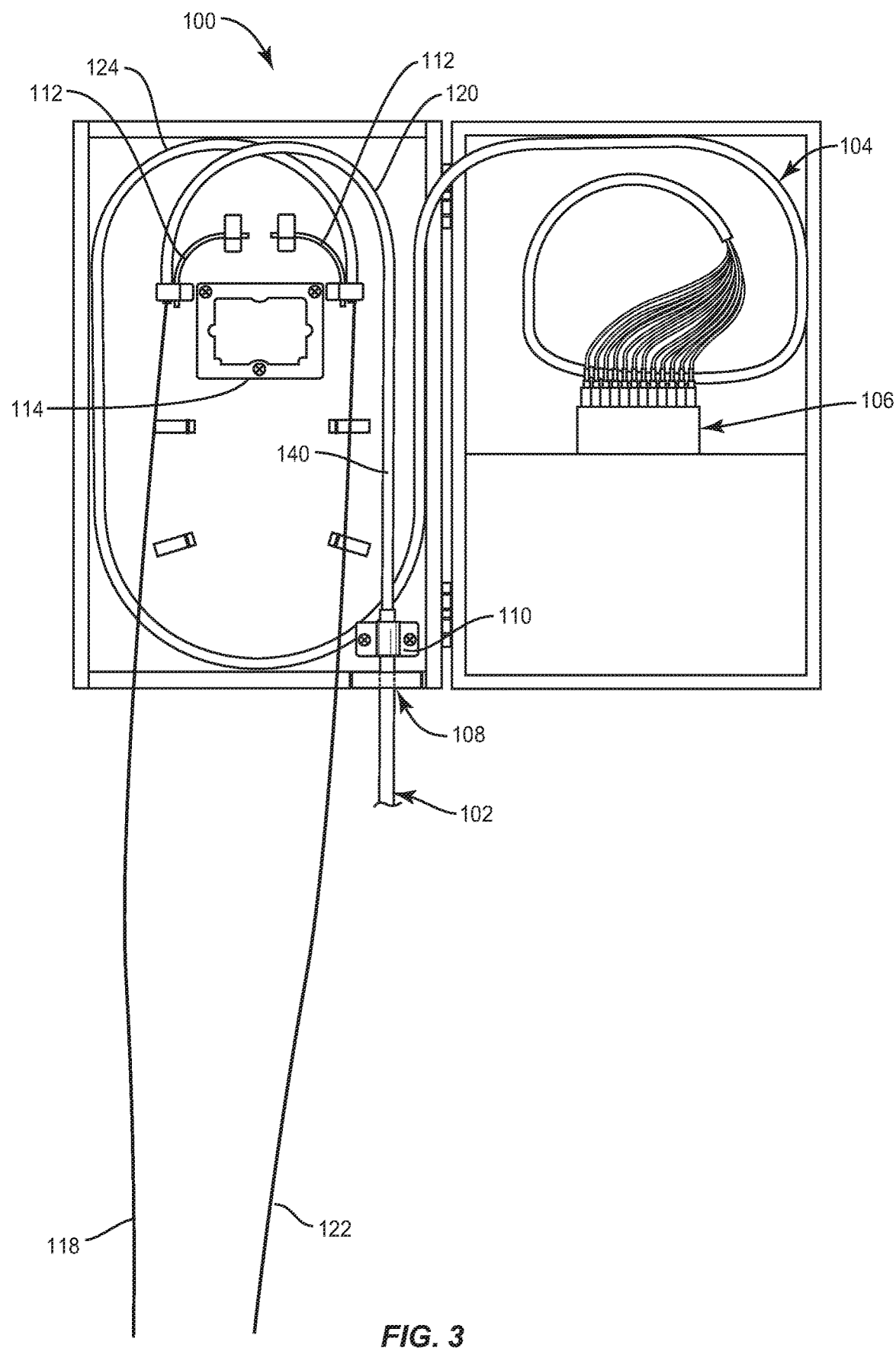
FIG. 3 depicts a terminating end of a fiber optic cable attached to a termination box, a fan-out fiber optic cable attached to the termination box and exposed ribbon fiber segments accessible from inside the termination box.

Referring to FIG. 3, a termination box 100 is provided. A terminating end of a fiber optic cable 102 is attached to the termination box 100, such that exposed ribbon fiber segment 118 from the fiber optic cable 102 is accessible from inside the termination box 100. As shown in 3, the terminating end of the fiber optic cable 102 is routed through the exterior cable port 108. Optionally, the fiber optic cable 102 may be routed through a cable compression seal at the exterior cable port 108. The cable compression seal includes components such as seals, O-rings, etc., and protects the interior of the termination box 100 from, e.g., water and undesired foreign particles. The terminating end of the fiber optic cable 102 is additionally routed through the exterior cable retention feature 110.

The fiber optic cable, 102 is prepared to include the exposed ribbon fiber segment 118 by stripping the jacketed portion 120 of the terminating the end of the fiber optic cable 102 at an endpoint. This may be done before or after the fiber optic cable 102 is routed through the exterior cable port 108. Several considerations determine how much fiber optic cable 102 is exposed from the jacketed portion 120. A sufficient length of exposed ribbon fiber segment 118 should be provided so that the exposed ribbon fiber segment 118 is accessible to an automated splicing machine, such as a fusion splicing machine. In addition, a sufficiently length of exposed ribbon fiber segment 118 should be provided so that two double loops may be routed in the termination box 100. This allows for two rotationally opposing loops, the advantages of which will be explained herein. Thus, the length of exposed ribbon fiber segment 118 is correlated to the size of termination box 100. Further, a sufficient length of exposed ribbon fiber segment 118 should ideally be provided such that the exposed ribbon fiber 118 may be pared back in the event that initial attempts at splicing are unsuccessful. According to an embodiment, approximately 48 inches of ribbon fiber segment 118 is exposed from the jacketed portion 120 of the fiber optic cable 102.

The fiber optic cable 102 is then arranged in the termination box such that an end of the jacketed portion 120, i.e., near a beginning of the exposed ribbon fiber segment 118, is secured to one of the bend controls 112 using the tie wrap 134. This arrangement allows the exposed ribbon fiber segment 118 to be spliced and manipulated while the position of the jacketed portion 120 of the fiber optic cable 102 is maintained. As a result, the fiber optic cable 102 as shown in FIG. 3 is attached to the termination box 100 in two locations: at the bend control 112 with the tie wrap 134 and near the cable port 108 with the cable retention feature 110. However, the disclosed method does not require attachment in two locations. Moreover, the locations of attachment within the termination box 100 may vary.

FIG. 3 additionally depicts the fan-out fiber optic cable 104 attached to the termination box 100, such that the exposed ribbon fiber segment 122 from the fan-out fiber optic cable 104 is accessible from inside the termination box 100. The exposed ribbon fiber segment 122 is obtained by stripping the jacketed portion 124 of the fan-out fiber optic cable 104, in a similar manner as previously discussed with respect to exposing the ribbon fiber segment 118 of the fiber optic cable 102. Ideally, the length of the exposed ribbon fiber segment 122 is substantially identical to the length of the exposed ribbon fiber segment 118, although it need not match precisely. One end of the fan-out fiber optic cable 104 is attached to the termination box 100 by the individual fan-out connections to the customer terminal interface 106. An opposite end of the fan-out fiber optic cable 104 is attached to the termination box 100 such that an end of the jacketed portion 124, i.e., near a beginning of the exposed ribbon fiber segments 122, is secured to one of the bend controls 112 using the tie wrap 134. As shown in FIG. 3, the end of the jacketed portion 124 of the fan-out fiber optic cable 104 is secured to a bend control 112 that is opposite to the bend control 112 that is used to secure fiber optic cable 102. This configuration allows for easy access to the exposed fiber segments 118, 122 for splicing and subsequent manipulation, while maintaining the position of the jacketed portions 120, 124 of the fiber optic cables 102, 104.

Figure 4:
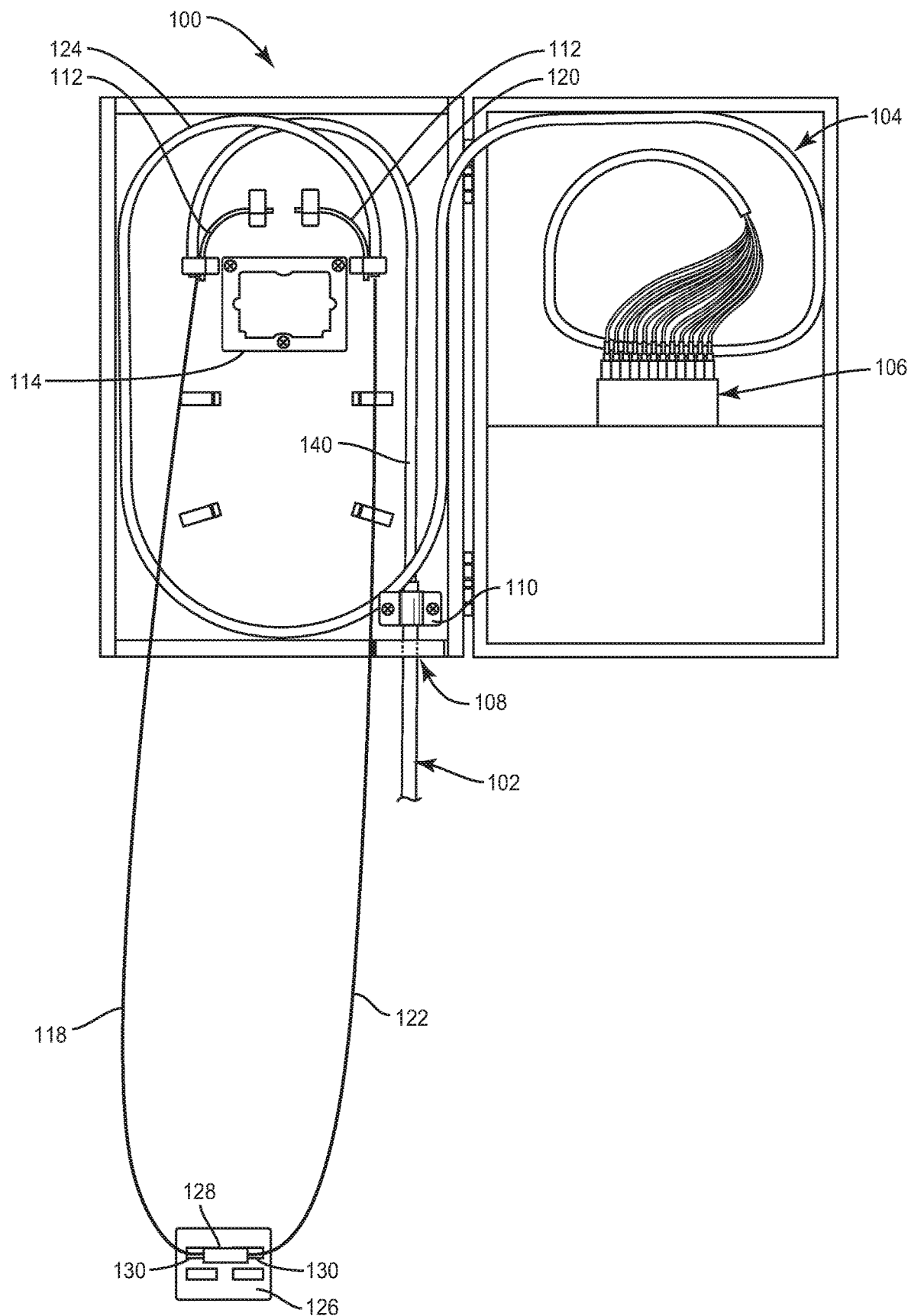
FIG. 4 depicts exposed ribbon fiber segments from a terminating end of a fiber optic cable spliced to exposed ribbon fiber segments from a fan-out fiber optic cable and secured in a splice retention cradle.

FIG. 4 depicts a splice of the exposed ribbon fiber segment 118 from the fiber optic cable 102 to a corresponding exposed ribbon fiber segment 122 from the fan-out fiber optic cable 104, such that the resulting splice has a splice covering 128 and such that the spliced ribbon fiber segments 118, 122 and the splice covering 128 form a continuous length of exposed ribbon fiber between the fiber optic cable 102 and the fan-out fiber optic cable 104. The splice and splice covering 128 are positioned at approximately a halfway point of the continuous length of exposed ribbon fiber. This allows for substantially equal lengths of exposed ribbon fiber on each side of the splice, which in turn allows for substantially symmetrical loops of fibers to be made according to methods discussed herein. A splice at the half-way point of the continuous length of exposed ribbon fiber may be achieved by removing sufficient length of the jacketed portions 120, 124 of the fiber optic cables 102, 104 such that the lengths of ribbon fiber segments 118, 122 are approximately identical. Additionally or alternatively, the lengths of ribbon fiber segments 118, 122 may be pared back after exposure from the jacketed portions 120, 124 of the fiber optic cables 102, 104 so that the lengths of ribbon fiber segments 118, 122 are approximately identical.

FIG. 4 additionally depicts the splice covering 128 secured to the splice retention cradle 126. As shown in FIG. 4, the splice covering 128 is secured to the splice retention cradle 126 using the snap-in features 130.

Figure 5:
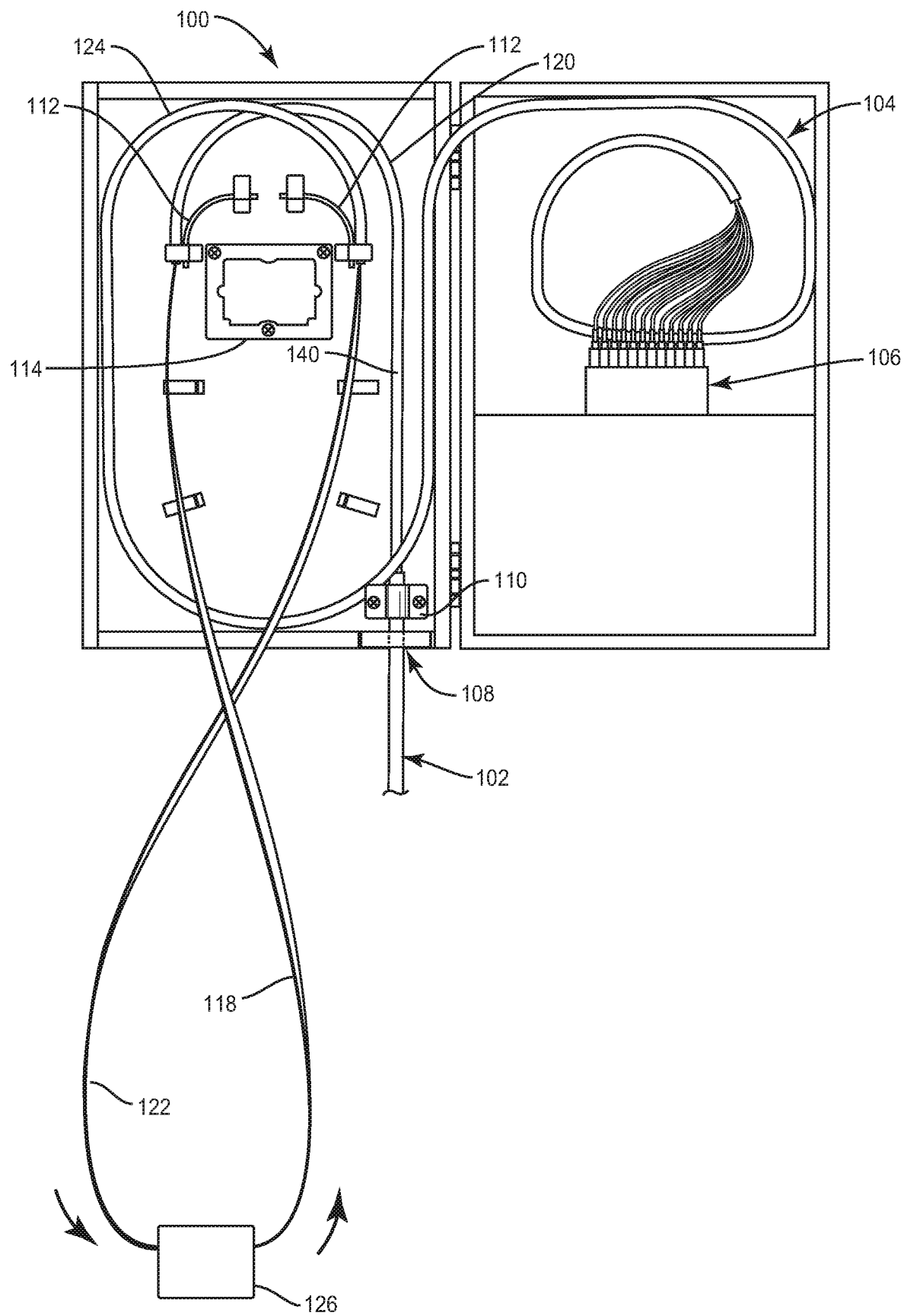
FIG. 5 depicts the splice retention cradle of FIG. 4 rotated so that the exposed ribbon fiber segments cross at a point between the splice retention cradle and the termination box.

FIG. 5 depicts the splice retention cradle 126 with the secured splice covering 128 of FIG. 4 rotated so that that the continuous length of exposed ribbon fiber crosses itself at a first crossing point 136 between the splice retention cradle and the termination box. The arrows in FIG. 5 indicate a counter-clockwise rotation of the splice retention cradle 126 from the perspective of an installer facing the termination box 100. Alternatively, the splice retention cradle 126 may be rotated in a clockwise direction so that that the continuous length of exposed ribbon fiber crosses itself at the first crossing point 136.

The steps depicted in FIGS. 6-9 omit certain features shown in FIGS. 3-5 for the sake of clarity.

Figure 6:
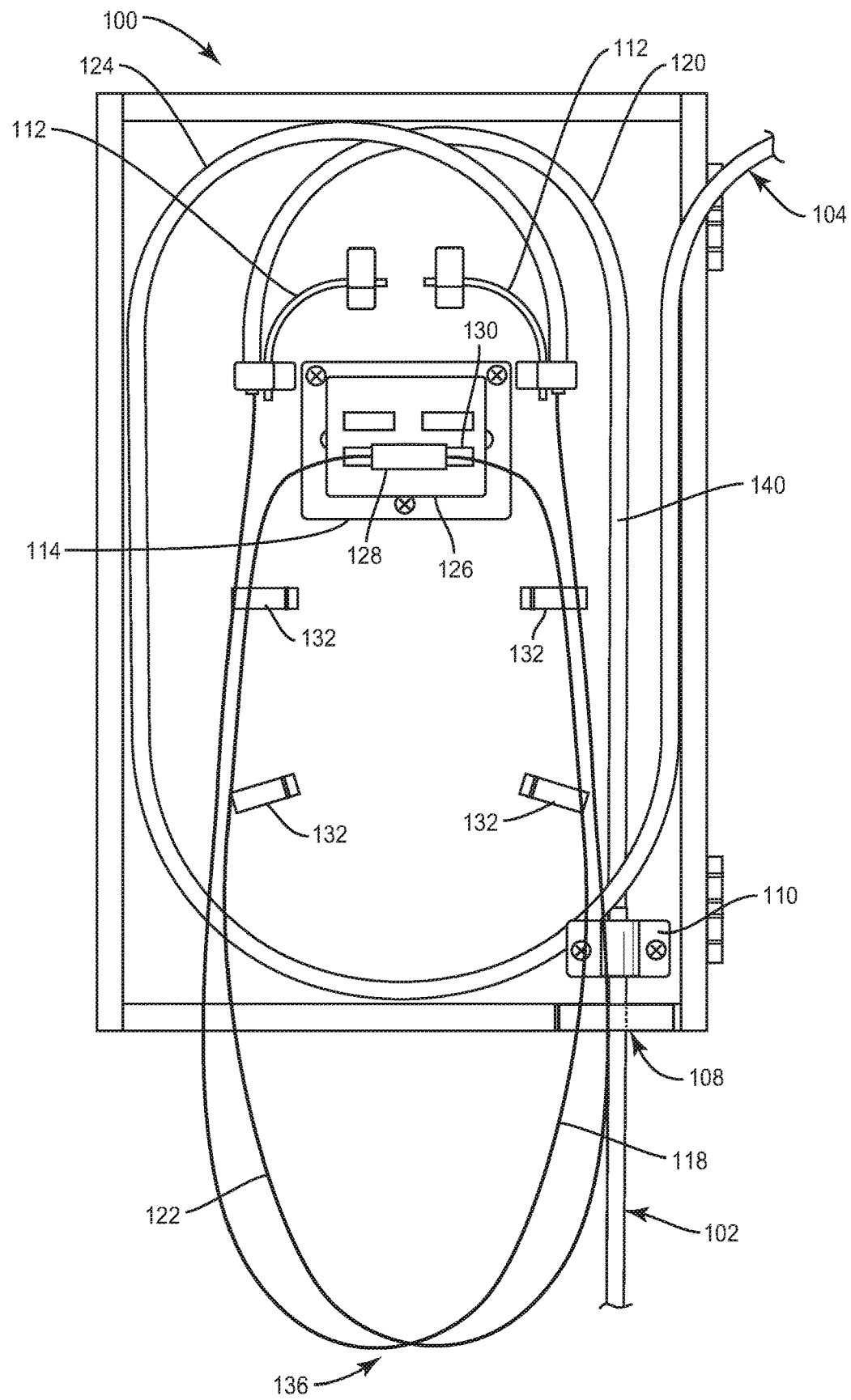
FIG. 6 depicts a splice retention cradle secured to the termination box and exposed ribbon fiber segments remaining crossed and forming a double loop.

FIG. 6 depicts the splice retention cradle 126 secured to the termination box 100 such that the exposed ribbon fiber remains crossed at the first crossing point 136 and forms a double loop. The splice retention cradle 126 may be secured to the termination box 100 by snapping the splice retention cradle 126 into the splice retention cradle frame 114. Alternative fastening techniques, such as screws, bolts, etc., are possible. The first crossing point 136 in the ribbon fiber may be maintained by moving the splice retention cradle 126 as oriented in FIG. 4 directly towards the termination box 100 without rotating the splice retention cradle 126 or otherwise untwisting the exposed ribbon fiber.

Figure 7:
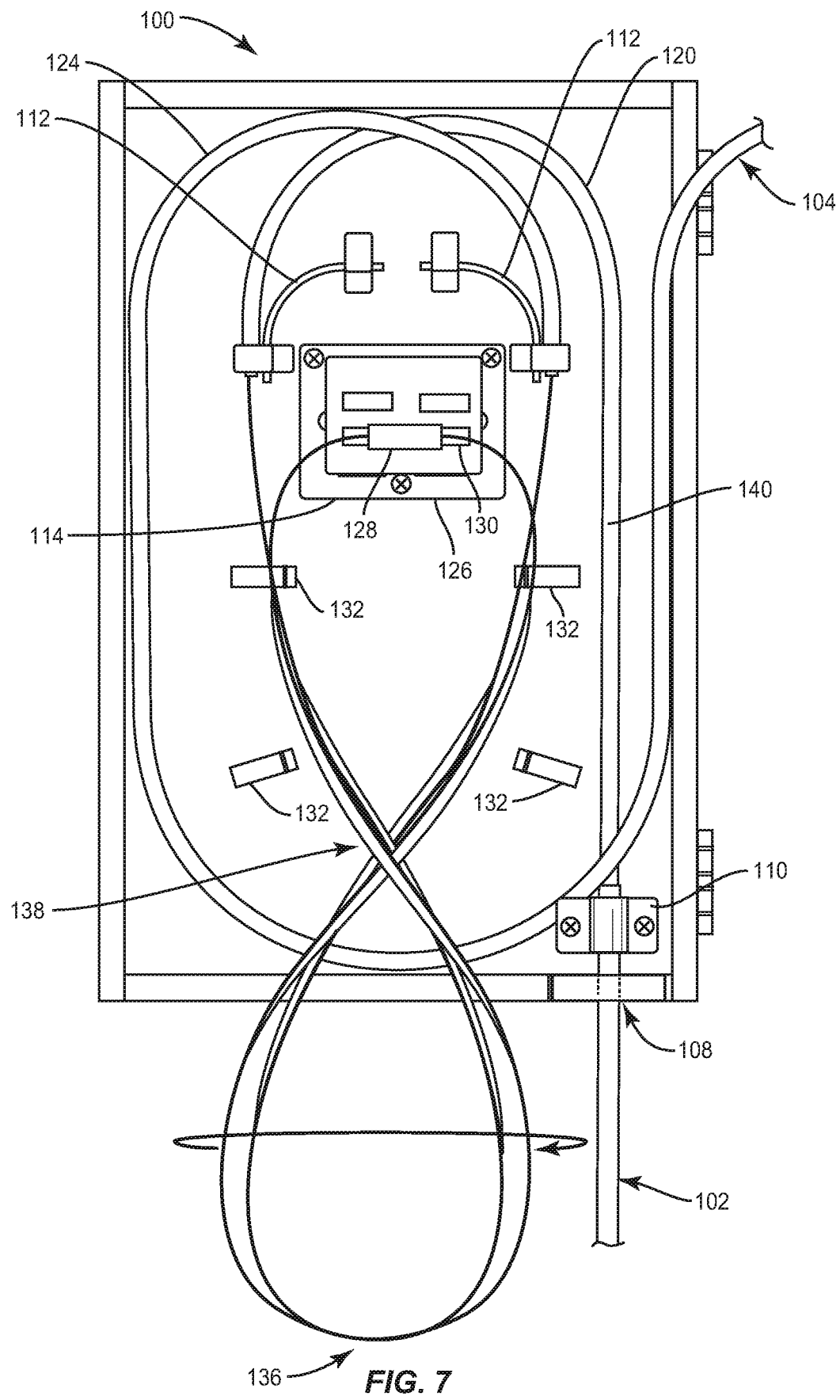
FIG. 7 depicts the exposed ribbon fiber segments of FIG. 6 flipped so that the double loop crosses itself.

FIG. 7 depicts the double loop of exposed ribbon fiber of FIG. 6 flipped, so that the double loop crosses itself at a second crossing point 138. A direction of flipping the double loop is shown by the rotational arrows of FIG. 7. According to an embodiment, the double loop of exposed ribbon fiber is flipped so that a second twist in the exposed ribbon fiber as a result of flipping the double loop as shown in FIG. 7 is in a reverse direction of the twist in the exposed ribbon fiber as a result of rotating the splice retention cradle 126 shown in FIG. 5. The effect of flipping the double loop of exposed ribbon fiber in this manner is that the twists in the crossed double loop rotationally oppose one another.

Figure 8:
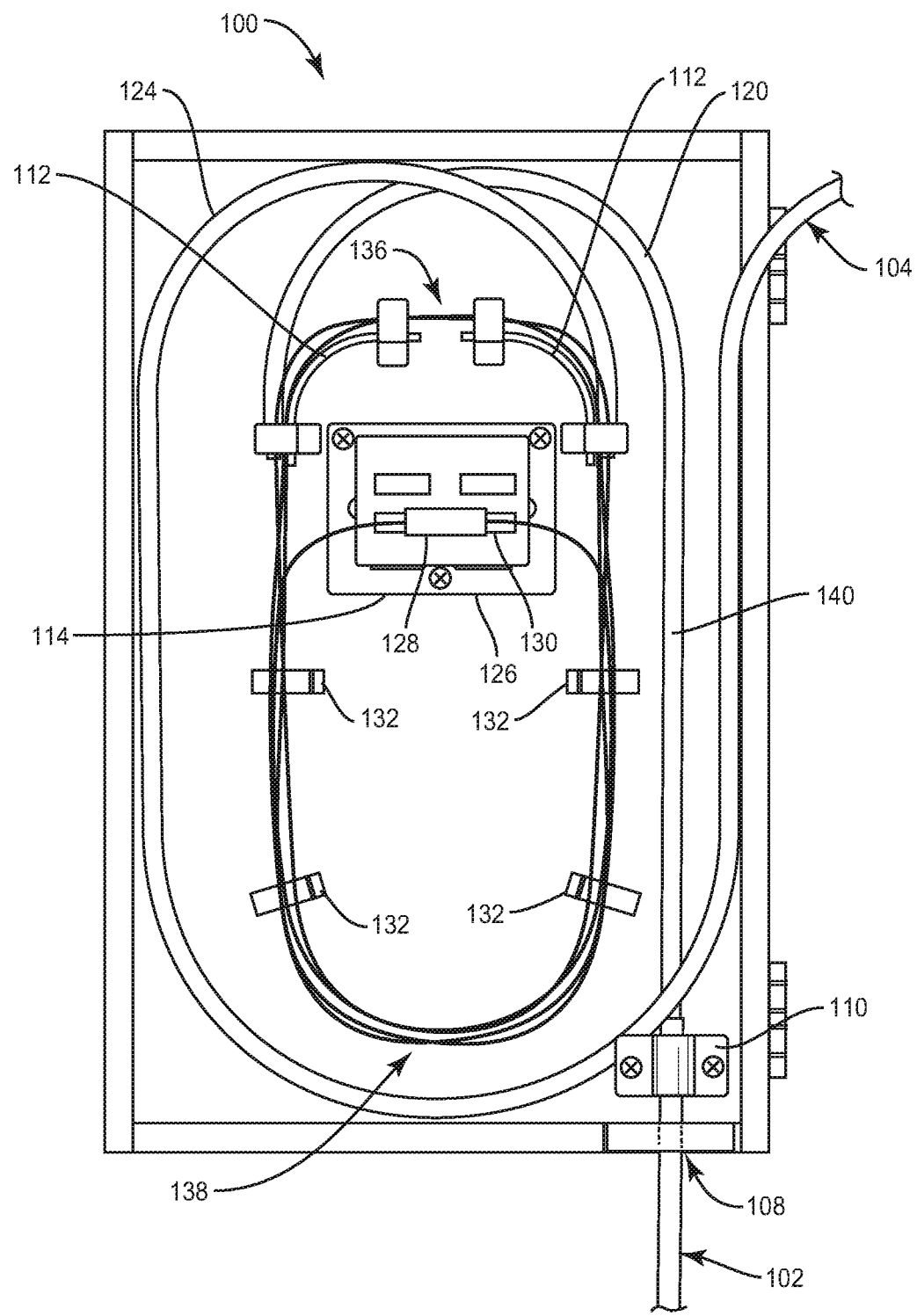
FIG. 8 depicts the double loop of FIG. 7 folded to form a quadruple loop of exposed ribbon fiber.

FIG. 8 depicts the double loop of exposed ribbon fiber of FIG. 7 folded to form a quadruple loop of exposed ribbon fiber. Folding may be done, from the perspective of an installer facing the termination box 100, by moving the bottom of the double loop up in the vicinity of the bend controls 112. The exposed ribbon fiber is folded around the second crossing point 138 such that the second crossing point 138 is in the vicinity of the bottom of the resulting folded quadruple loop.

Figure 9:
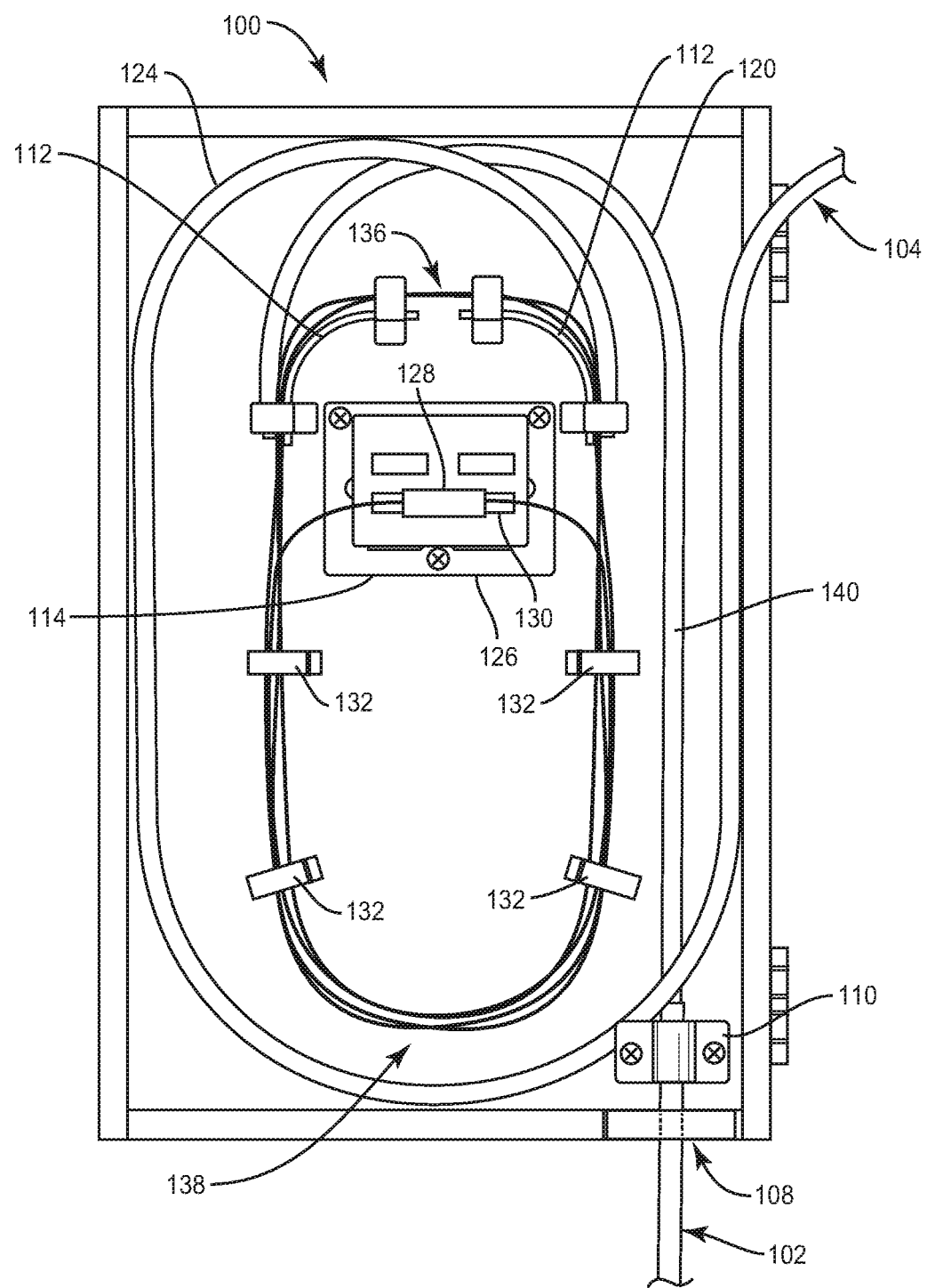
FIG. 9 depicts the quadruple loop of FIG. 8 secured to the termination box using routing clips.

FIG. 9 depicts the quadruple loop of exposed ribbon fiber shown in FIG. 8 secured to the termination box 100 using the routing clips 132. The break feature of the routing clips 132 is opened, the exposed ribbons are inserted into the break feature and the break feature is closed so that the routing clips 132 permanently retain the exposed ribbons. As shown in FIG. 9, four routing clips are positioned such that two routing clips are directly beneath each of the bend controls 112 and spaced apart by approximately the same distance. However, different quantities and positioning of the routing clips 132 are possible. Ideally, a sufficient number of routing clips 132 are positioned so that the quadruple loop of exposed ribbon is secured but allowed to maintain its shape.

Advantageously, the methods disclosed herein allow for a substantial length ribbon to be exposed from jacketed portions of fiber optic cable in advance of splicing. The quadruple loop that is formed as a result of the methods discussed herein accommodates a substantial length of ribbon efficiently within a termination box. Moreover, the methods discussed herein tolerate a significant variation in the amount of length of exposed ribbon that is secured to the termination box after the splice is made. This tolerance is partly due to the fact that the position and number of routing clips 132 may vary. Thus, the size of the quadruple loop that is ultimately secured to the termination box may correspondingly vary. Further, the disclosed method allows for termination of a fiber optic cable in a variety of termination boxes having substantially differing size and available area for storage of exposed ribbon. Moreover, the disclosed methods accommodate variation in the length of exposed fiber due to the possibility that exposed ribbon is pared back during splicing.

Additionally, the methods disclosed herein advantageously accommodate exposed ribbon fiber that remains after splicing within a termination box in a safe and secure manner. The loops efficiently route the exposed ribbon approximately around a perimeter of a termination box in such a manner that avoids acute changes in shape. Because the loops are somewhat tightly contained within the routing clips, the exposed ribbon is protected from rubbing against other components in the termination box. Additional advantages are obtained by the embodiment the method resulting in twists of the crossed double loop that oppose one another. The opposing twists are advantageous because the self-restricting nature of the double crossed loop prevents the ribbon fiber from naturally reverting to another shape. Thus, an installer may manipulate and secure the ribbon fiber to the routing clips 116 with less likelihood that the ribbon fiber will protrude in different directions and potentially brush against potentially damaging surfaces in the termination box 100.

Additionally, the disclosed methods utilize simple, low-cost components while simultaneously providing a safe and reliable way to store the exposed ribbon fiber segments. For instance, the splice retention cradle 126 may be a simple and relatively small structure, for example, approximately three inches long and two inches wide, and be made of plastic. The routing clips 132 may be, for example, approximately one inch in circumference, and may be made of plastic. These components advantageously reduce cost and complexity over, e.g., larger cable splice trays in which the perimeter of the tray is used to route exposed ribbon fiber segments.

The particular features of the components disclosed herein are provided for exemplary purposes of discussing the disclosed methods. However, components having different features may be used in conjunction with the disclosed methods. For instance, the tie wrap 134 may be substituted with any device suitable for securing jacketed portions 120, 124 of fiber optic cables 102, 104 to the termination box 100, such as a hose clamp. The routing clips 134 may be substituted with any device suitably configured to retain exposed fiber ribbon, and does not need to be movable or dimensioned as shown. For instance, the routing clips 134 may be permanent features that are constituent components of the termination box 100. The position and number of bend controls 112 may vary. For example, the termination box 100 may include four bend controls 112 positioned each of the corners of the termination box 100.

The disclosed methods are equally applicable to the termination of more than one fiber optic cable and corresponding fan-out ribbon fiber. For example, the disclosed method may be performed with two fiber optic cables 102 and two fan-out fiber optic cables 104. The exposed ribbon fiber segments of each cable 102, 104 may combined and simultaneously formed into loops, ultimately resulting in quadruple loops, according to the methods disclosed herein.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A fiber optic termination box, comprising:
   a planar back section;
   outer walls surrounding the planar back section;
   an exterior cable port formed in a first one of the outer walls and comprising an opening that is dimensioned to allow a terminating end of a fiber optic cable to be fed into the termination box; and
   a bend control structure, comprising:
      first and second curved planar sections that are affixed to and extend away from the from the planar back section; and
      first and second planar tabs that attach respectively to the first and second curved planar sections at top edges of the respective first and second curved planar sections that are opposite the planar back section;
      wherein the first curved planar section comprises a first lower edge side that faces the first outer wall, and a first bend that curves away from the first lower edge side and towards the second curved planar section,
      wherein the second curved planar section comprises a second lower edge side that faces the first outer wall, and a second bend that curves away from the first second lower edge side and towards the first curved planar section,
      wherein the first planar tab laterally extends away from the first lower edge side in an opposite direction as the first bend, and
      wherein the second planar tab extends away from the second lower edge side in an opposite direction as the second bend.

2. The fiber optic termination box of claim 1, wherein the first and second curved planar sections respectively comprise first and second spans that and respectively extend away from the first and second lower edge sides in a direction that is substantially orthogonal to the first outer wall, wherein the first planar tab attaches to and laterally extends away from the first span, and wherein the second planar tab attaches to and laterally extends away from the second span.

3. The fiber optic termination box of claim 2, wherein the first planar tab comprises first and second outer edge sides that are opposite one another and laterally extend from the first span to an end of the first planar tab, and wherein the second planar tab comprises third and fourth outer edge sides that are opposite one another and laterally extend from the second span to an end of the second planar tab.

4. The fiber optic termination box of claim 3, wherein the first and second outer edge sides extend in a direction that is substantially orthogonal to the direction of extension of the first span, wherein the third and fourth outer edge sides extend in a direction that is substantially orthogonal to the direction of extension of the second span.

5. The fiber optic termination box of claim 2, wherein the first and second curved planar sections respectively comprise third and fourth spans that extend in a direction that is substantially parallel to the first outer wall, wherein the first bend forms a curved transition between the first and third spans, and wherein the second bend forms a curved transition between the second and fourth spans.

6. The fiber optic termination box of claim 5, wherein the first and second curved planar sections respectively comprise first and second upper edge sides that are laterally spaced apart from one another and face one another, wherein the third span extends to the first upper edge side, and wherein the fourth span extends to the second upper edge side.

7. The fiber optic termination box of claim 5, wherein the bend control structure further comprises:
    third and fourth planar tabs that attach respectively to the first and second curved planar sections at top edges of the first and second curved planar sections that are opposite the planar back section,
    wherein the third planar tab attaches to and laterally extends away from the third span, and
    wherein the fourth planar tab attaches to and laterally extends away from the fourth span.

8. The fiber optic termination box of claim 7, wherein the third and fourth planar tabs laterally extend away from the first outer wall.

9. The fiber optic termination box of claim 1, further comprising:
    a splice retention cradle frame disposed between the first and second curved planar sections.

10. The fiber optic termination box of claim 9, wherein the splice retention cradle frame partially overlaps with the first and second curve shaped bend controls in a vertical direction of the termination box, wherein the vertical direction is orthogonal to the first outer wall.

11. A fiber optic cable splice storage assembly, comprising:
    a termination box, comprising:
    first and second curve shaped bend controls disposed in an upper half of the termination box, wherein the first and second curve shaped bend controls face each other and are detached from one another;
    an exterior cable port disposed at a lower side of the termination box and comprising an opening that is dimensioned to allow a terminating end of a fiber optic cable to be fed into the termination box; and
    a splice retention cradle frame disposed between the first and second curve shaped bend controls in the top half of the termination box;
    a splice retention cradle comprising splice retention features that are dimensioned to accommodate a splice covering for fiber optic cable,
    wherein the first and second curve shaped bend controls each comprise a curved surface extending away from a planar back section of the termination box and a planar surface that extends away from the curved surface,
    wherein the planar surface is spaced apart from the planar back section,
    wherein the splice retention cradle frame is disposed below the first and second curve shaped bend controls in a vertical direction of the termination box when the splice retention cradle is snapped securely into the splice retention cradle frame,
    wherein the first and second curve shaped bend controls each comprise first and second ones of the planar surfaces disposed respectively at the lower and upper ends of the first and second curve shaped bend controls, the first planar surfaces extending in a horizontal direction that is perpendicular to the vertical direction, and the second planar surfaces extending in the vertical direction.

* * * * *